June 24, 1952  E. M. BOAT  2,601,496
DIAL BORE GAUGE
Filed July 21, 1947 2 SHEETS—SHEET 1
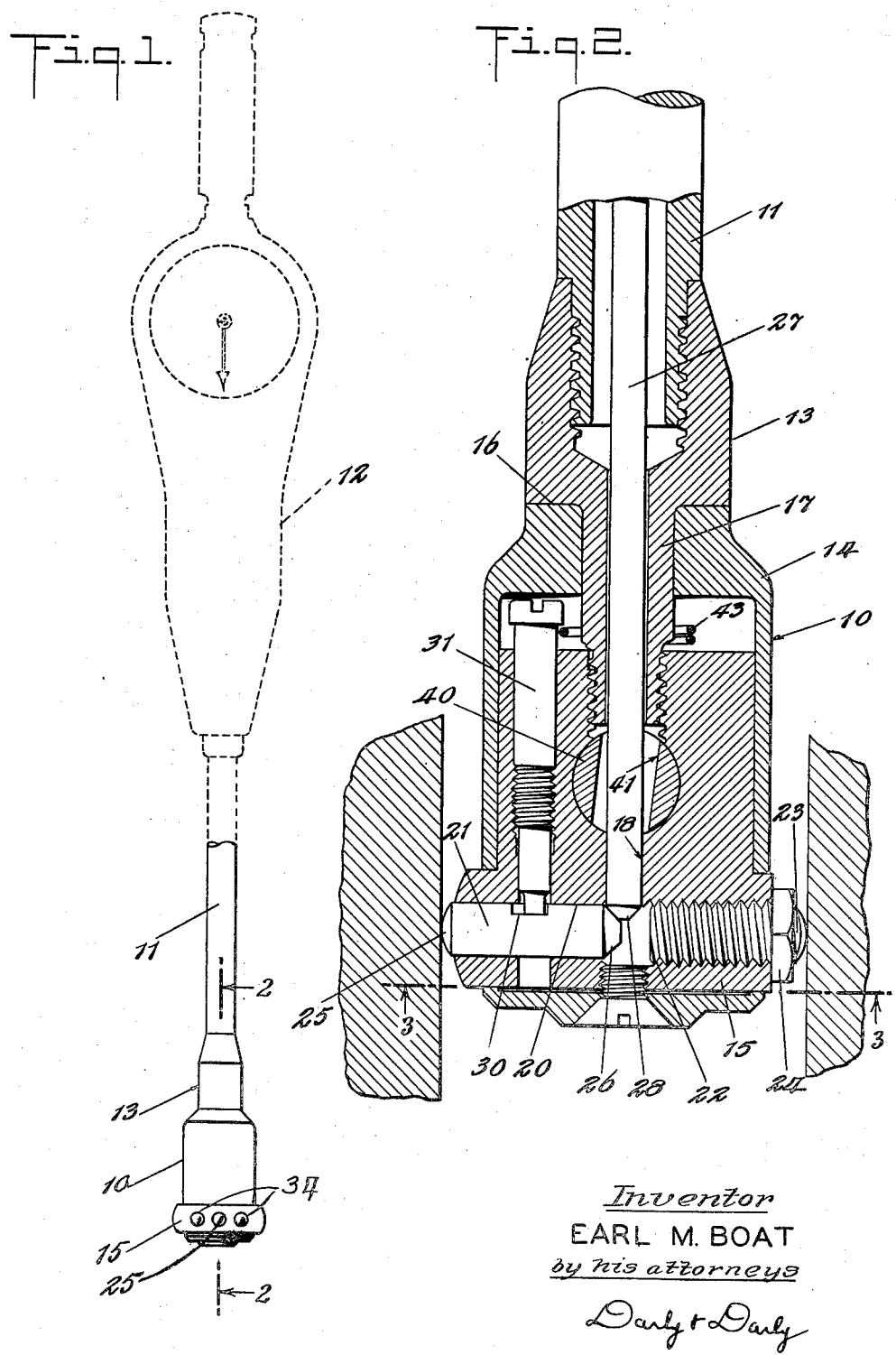
Inventor
EARL M. BOAT
by his attorneys
Darby & Darby

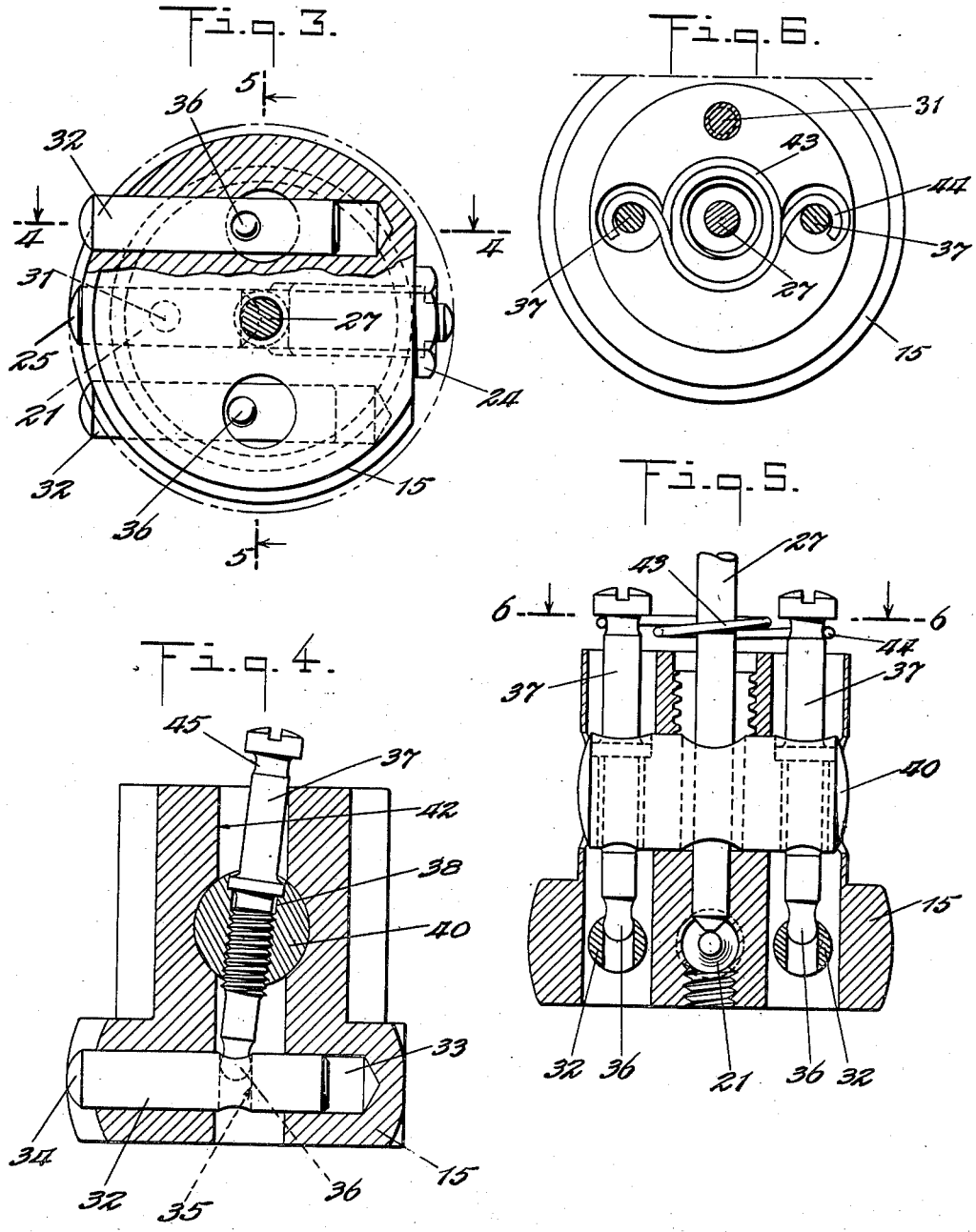

Patented June 24, 1952

2,601,496

UNITED STATES PATENT OFFICE 2,601,496

DIAL BORE GAUGE

Earl M. Boat, Poughkeepsie, N. Y., assignor to Standard Gage Company, Inc., Poughkeepsie, N. Y., a corporation of New York Application July 21, 1947, Serial No. 762,434

3 Claims. (Cl. 33—178)

The present invention relates to bore gages and particularly to dial bore gages in which the indication is given by the position of a pointer or hand on a cooperating dial.

More particularly still the invention relates to a form of dial bore gage in which means are provided for centering the gaging head in a bore, these means being so constructed as to render the gage usable in bores of relatively very small diameter as, for example, bores of diameters of as little as 0.625 inch.

In the past many bore gages of the dial indicator type have been constructed but most of these bore gages were provided with means for centering the gage head in the bore such that it was impractical, if not impossible, to construct the gage for measurement of bores of less than 1 or 1½ inches in diameter. As indicated above, the gage of the present invention while simple in construction and economical to manufacture is at the same time so small as to make possible the measurement of bores heretofore commonly measured only with plug gages.

It is an object of the invention to provide a dial bore gage capable of accurately measuring the diameter of small bores.

It is another object of the invention to provide a centering means for the gage head which contributes to the first stated object.

It is another object of the invention to provide a centering means for the gage head in which the usual centering plungers move parallel to the measuring plunger rather than at angles thereto as has been customary in the past.

It is a further object of the invention to provide a dial indicator capable of measuring small bores in which the parts are few in number and readily assembled thus rendering the gage economical to manufacture and low in price.

Other objects and features of the invention will be apparent when the following description is taken in connection with the annexed drawings in which—

Figure 1 is a top plan view of the dial bore gage of my invention showing the dial indicator itself in dash lines;

Figure 2 is an enlarged longitudinal sectional view of the gaging head, this view being taken on the plane of the line 2—2 of Figure 1;

Figure 3 is a transverse cross-sectional view of the gage taken on the plane of the line 3—3 of Figure 2;

Figure 4 is an enlarged cross-sectional view taken on the plane of the line 4—4 of Figure 3 and showing particularly the mode of operating the centering plungers;

Figure 5 is a longitudinal cross-sectional view the section being taken on the plane of the line 5—5 of Figure 3 and illustrating particularly the assemblage of the centering plungers and the resilient member which presses them outwardly against the bore as well as the measuring plunger and its cooperating indicator operating rod; and Figure 6 is a transverse cross-sectional view taken on the plane of the line 6—6 of Figure 5 and showing the mode in which a spring member exerts its pressure against the centering plungers.

Referring now to the drawings, the gage of my present invention comprises a housing member 10 which is provided with a bore at its upper end as seen in Figure 2 and into which is threaded a sleeve 11 which sleeve is provided at its remote end with a clamping member for holding a dial indicator such as that outlined in Figure 1 at 12. The indicator shown is of the type disclosed in Emery Patent No. 2,226,756 of December 31, 1940. However, any other dial indicator might be utilized, the clamping member being made to fit.

The housing 10 comprises members 13, 14 and 15. The member 13 is provided with a shoulder at 16 against which the housing element 14 seats, this element being provided with an internal bore which fits over the reduced portion 17 of member 13. The member 15 in addition to forming a housing for the parts also carries the measuring and centering plungers as will hereinafter appear. This member 15 has a central bore 18 therein which bore is at its upper end (as seen in Figure 2) enlarged and threaded. The member 15 is threaded onto the threaded reduced extension 17 of member 13 and when in this position the extreme hollow end of the member 14 fits against shoulders of the block or member 15 and forms a unitary structure.

The block 15 is provided with three parallel bores the central one of which 20 forms a guide for the measuring plunger 21. The bore 20 extends entirely through the block 15 and is threaded at one end, as indicated at 22, for insertion of the stationary pin 23 which cooperates with the plunger 21 to perform the measuring function. The pin 23 is provided with a lock nut 24 in order that its position may be adjusted. In addition, by replacing the pin 23 with a longer or shorter pin the range of the instrument may be altered.

The measuring plunger 21 is provided at its outer end with a spherical termination 25 in the usual manner and is provided at its inner end with a 45° bevel as indicated at 26. In like manner the movement transmitting rod 27 which extends through the central bore in member 13 and is guided by the central bore 18 in member 15 is provided with a 45° bevel 28 at its outer end which presses against the bevel 26. Thus any inward movement of the plunger 21 causes a corresponding movement of rod 27 which bears against the measuring plunger of the dial indicator 12. This results in actuation of the indicator to give an indication of the diameter of the piece being measured. The measuring plunger 21 is caused to move outwardly by virtue of the spring action against the measuring plunger of the dial indicator 12 and is limited in its outward movement by means of the notch 30 in the measuring plunger into which protrudes the end of a screw 31 which is threaded into the block 15.

The elements thus far described would serve to give an indication of the diameter of a bore but would be practically of no use since there would be no assurance that the diameter was measured, that is, some lesser chord of the bore circumference might be measured rather than the true diameter. In order to assure that the measurement taken will be on a diameter, the instrument is provided with a pair of centering plungers 32, these plungers being guided in bores 33 in the block 15 extending parallel to the bore 20 in which the measuring plunger is located. The centering plungers 32 terminate at their outer ends in spherical portions 34 which make contact with the walls of the bore and are normally spring pressed outwardly by the means about to be described.

Each plunger 32 is provided with a transverse bore 35 and into each bore 35 there extends a ball like end 36 of a screw 37. The two screws 37 are threaded into a pair of transverse bores 38 in the cylindrical member 40, the member 40 being pivotally mounted in the block 15. The structure just described is such as to provide a common pivot 40 for the screws 37 the axis of which pivot is parallel to the common perpendicular to the axes of the centering plungers 32. Member 40 is provided with a central transverse bore 41 through which the rod 27 extends, the bore 41 being sufficiently large so that irrespective of the rotational position of the member 40 there is no contact between the rod 27 and the walls of bore 41. It is, of course, to be understood that the rotational movement of the member 40 is limited since the movement of screws 37 is limited by the walls of the bores 42 through which bores these screws extend.

In order to press the centering plungers 32 outwardly against the bore walls, a spring 43 is provided, this spring being helically formed (as seen particularly in Figure 6) and being provided with hooked ends 44 which underlie grooves 45 formed in screws 37. The central portion of the spring 43 surrounds the cylindrical extension 17 of member 13, and is prevented from expanding without exerting pressure against levers 37 because a portion of the spring will come into contact with the screw 31.

It will be seen that as a result of the construction of the centering device and particularly because of the fact that the bores in which the centering plungers or pins 32 operate are parallel to the measuring plunger, the gaging head is extremely small and thus the gage is adapted to the measurement of small bores. Furthermore, because of the construction utilized the assemblage of the device is extremely simple and it can, therefore, be inexpensively manufactured. Since the two centering plungers are equidistant from the measuring plunger and move together they will cause the gaging head to be centered in a bore and will thus assure that the measurement taken will be across the true diameter of a bore. The centering plungers, as is clearly shown in Figure 3, normally protrude beyond the measuring plunger with respect to the circumferential line of the bore and are forced inwardly by the bore walls against the pressure exerted by the spring 43, at the same time, of course, causing the gaging head to shift in the bore until the measuring plunger 21 and the cooperating element 23 make contact with the bore at diametrically opposite points.

While I have described a preferred embodiment of my invention, it is obvious that other embodiments and constructions may be adopted without departing from the spirit thereof and, consequently, I desire to be limited not by the foregoing description, but solely by the scope of the appended claims.

What is claimed is:

1. In a dial bore gage adapted to the measuring of small bores and having a measuring plunger and means for transmitting movement thereof to a dial indicator, in combination, a pair of centering plungers slidably mounted in the same plane with and on either side of said measuring plunger in bores in the gaging head, said bores being parallel to the measuring plunger and spaced on either side thereof, a pair of levers, each said lever terminating in a ball like portion, holes in said centering plungers into which said ball like portions extend, a common pivot for said levers, said pivot extending transversely of the gaging head and intersecting the longitudinal center line thereof, a bore through said pivot through which the movement transmitting means passes, and a coil spring extending about the movement transmitting means and having its ends in engagement with the ends of said levers remote from said centering plungers to thereby urge said levers in a direction to project said centering plungers outwardly into contact with the walls of a bore.

2. In a dial bore gage adapted to the measuring of small bores and having a measuring plunger and means for transmitting movement thereof to a dial indicator, in combination, a pair of centering plungers slidably mounted on either side of said measuring plunger in bores in the gaging head, said bores being parallel to the measuring plunger and spaced on either side thereof, a pair of levers, each said lever terminating in a ball-like portion, holes in said centering plungers into which said ball-like portions extend, a cross member connecting said levers and fixed thereto, said cross member forming a common pivot, the axis of which lies between the centering plungers and the dial indicator and parallel to a common perpendicular to the axes of said plungers, clearance holes in said gaging head surrounding said levers to limit the equal oscillating movement of said levers, and resilient means for causing said levers to rock about said common pivot and urge said centering plungers outwardly against the wall of the bore.

3. In a dial bore gage adapted to the measuring of small bores and having a measuring plunger and means for transmitting movement thereof to a dial indicator, in combination, a pair of centering plungers slidably mounted on either side of said measuring plunger in bores in the gaging head, said bores being parallel to the measuring plunger and spaced on either side thereof, a pair of levers, each said lever terminating in a ball-like portion, holes in said centering plungers into which said ball-like portions extend, a cross member connecting said levers and fixed thereto, said cross member forming a common pivot, the axis of which lies between the centering plungers and the dial indicator and parallel to a common perpendicular to the axes of said plungers, clearance holes in said gaging head surrounding said levers to limit the equal oscillating movement of said levers, and a coil spring having its ends formed in hook shape, each end engaging the end of one of said levers remote from said ball-like termination, said spring urging said centering plungers outwardly against the wall of the bore.

EARL M. BOAT.

REFERENCES CITED

The following references are of record in the file of this patent:

UNITED STATES PATENTS

| Number | Name | Date |
|---|---|---|
| 2,253,803 | Newberry | Aug. 26, 1941 |
| 2,345,845 | Wells | Apr. 4, 1944 |
| 2,385,157 | Nilsson et al. | Sept. 18, 1945 |
| 2,424,497 | Nilsson | July 22, 1947 |
| 2,429,511 | Emery | Oct. 21, 1947 |
| 2,435,949 | Worthen | Feb. 10, 1948 |

FOREIGN PATENTS

| Number | Country | Date |
|---|---|---|
| 216,460 | Great Britain | Mar. 26, 1923 |

OTHER REFERENCES

American Machinist, Feb. 13, 1935, page 183.